United States Patent
Asano

(10) Patent No.: US 10,915,790 B2
(45) Date of Patent: Feb. 9, 2021

(54) MACHINE LEARNING APPARATUS, IMAGING TIME ESTIMATION APPARATUS, MACHINE LEARNING PROGRAM, AND GENERATION METHOD OF PHOTOGRAPHIC DATA

(71) Applicant: SEIKO EPSON CORPORATION, Tokyo (JP)

(72) Inventor: Tetsuya Asano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 81 days.

(21) Appl. No.: 16/407,313

(22) Filed: May 9, 2019

(65) Prior Publication Data

US 2019/0347521 A1    Nov. 14, 2019

(30) Foreign Application Priority Data

May 11, 2018    (JP) .................................. 2018-091951

(51) Int. Cl.
*G06K 9/62*        (2006.01)

(52) U.S. Cl.
CPC ....... *G06K 9/6256* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 2005/0036692 A1 | 2/2005 | Iida et al. | |
| 2005/0078885 A1 | 4/2005 | Ozaki et al. | |
| 2018/0239904 A1* | 8/2018 | Kiner | G06F 21/577 |
| 2019/0108441 A1* | 4/2019 | Thibault | G01N 23/046 |
| 2020/0160970 A1* | 5/2020 | Lyman | G16H 30/40 |
| 2020/0163639 A1* | 5/2020 | De Man | A61B 6/5205 |
| 2020/0211160 A1* | 7/2020 | Zhang | G06T 5/001 |

FOREIGN PATENT DOCUMENTS

| | | |
|---|---|---|
| JP | 2004-348620 A | 12/2004 |
| JP | 2005-115672 A | 4/2005 |

* cited by examiner

*Primary Examiner* — Jiangeng Sun
(74) *Attorney, Agent, or Firm* — Global IP Counselors, LLP

(57) ABSTRACT

A machine learning apparatus includes a learning target obtaining unit that obtains a plurality of photographic data items of scanned photographs and a learning unit that learns imaging times of the photographs in which imaging dates are not imprinted based on the photographic data items.

5 Claims, 7 Drawing Sheets

MACHINE LEARNING APPARATUS, IMAGING TIME ESTIMATION APPARATUS, MACHINE LEARNING PROGRAM, AND GENERATION METHOD OF PHOTOGRAPHIC DATA

The present application is based on, and claims priority from JP Application Serial Number 2018-091951, filed May 11, 2018, the disclosure of which is hereby incorporated by reference herein in its entirety.

BACKGROUND

1. Technical Field

The present disclosure relates to a machine learning apparatus, an imaging time estimation apparatus, a machine learning program, and a generation method of photographic data.

2. Related Art

In the related art, there is a need for the rearrangement of a plurality of scanned photographs in order of date. For example, JP-A-2004-348620 discloses a technology in which a negative film and a photographic print are scanned, the same image is searched for from the scanning result, and an imprinted date extracted from the negative film is specified as an imaging date of the print image.

It is not possible to specify an imaging time of a photograph in which an imaging date is not imprinted.

SUMMARY

A machine learning apparatus includes an obtaining unit that obtains photographic data items of scanned photographs, and a learning unit that learns imaging times of the photographs in which imaging dates are not imprinted based on the photographic data items. According to the aforementioned configuration, even though the imaging date is not imprinted in the photograph, it is possible to estimate the imaging time when the photograph is captured.

The learning unit may perform the learning based on training data items obtained by associating the photographic data items with the imaging times of the photographs. According to this configuration, it is possible to estimate the imaging time of the photograph even though the relationship between the feature of the photograph and the imaging time is not clearly defined by human judgment.

The training data items may include data items obtained by associating the photographic data items obtained by scanning the photographs in which imaging dates are imprinted with imaging times indicating the imprinted imaging dates. That is, when the imaging date is imprinted and thus, the photographic data is generated by scanning the photograph of which the imaging date is clearly specified, it is possible to generate the training data having a high possibility that an accurate output is to be obtained by associating the imaging date with the photographic data.

DESCRIPTION OF EXEMPLARY EMBODIMENTS

Hereinafter, an embodiment of the present disclosure will be described according to the following order.

Figure 1:
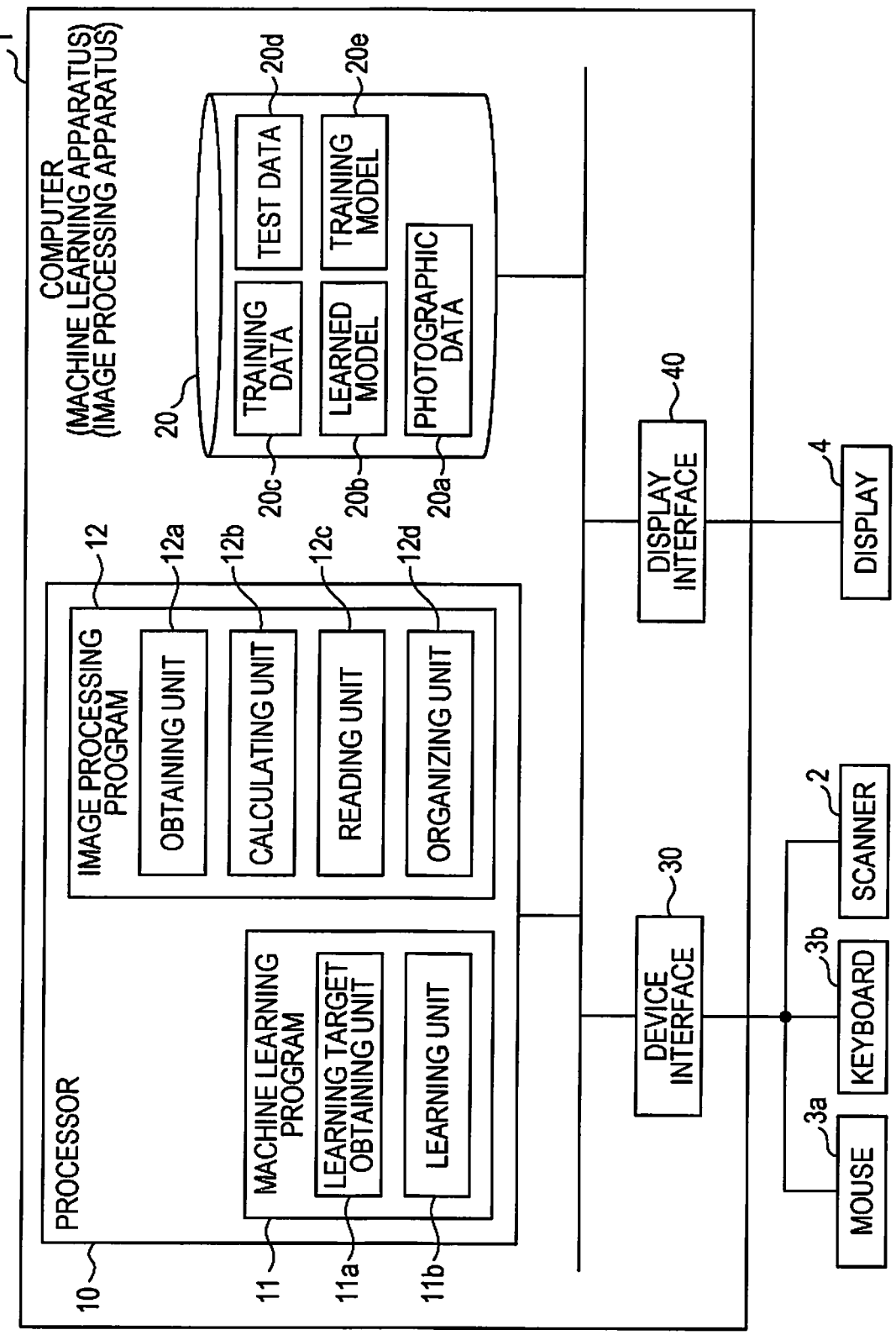
FIG. 1 is a block diagram of a machine learning apparatus and an image processing apparatus.

(1) Configuration of Machine Learning Apparatus and Image Processing Apparatus:
(2) Machine Learning Processing:
(3) Image Processing:
(4) Other Embodiments:

(1) Configuration of Machine Learning Apparatus and Image Processing Apparatus FIG. 1 is a block diagram illustrating a machine learning apparatus and an image processing apparatus according to an embodiment of the present disclosure. The machine learning apparatus and the image processing apparatus according to the present embodiment is realized by a computer 1 to which a scanner 2 is connected. The computer 1 includes a processor 10, a hard disk drive (HDD) 20, a device interface 30, and a display interface 40.

The device interface 30 is an interface configured to connect to a device that performs communication according to a predetermined communication protocol (for example, a Universal Serial Bus (USB) standard). In the present embodiment, the scanner 2, a mouse 3a, and a keyboard 3b are connected to the device interface 30. The scanner 2 includes a light source that illuminates light on a document, a color image sensor that receives light from the document and uses the received light as read data, a device component for moving various movable units, and the like.

In the present embodiment, the scanner 2 can read printed photographs, and can output photographic data items. The computer 1 obtains the photographic data items output by the scanner 2 through the device interface 30, and stores photographic data items 20a in the HDD 20. There may be various aspects as the method of reading the document in the scanner 2. A flatbed scanner may be used, a method of reading a transport document using an ADF may be used, or both the methods may be used.

The mouse 3a includes an operation unit and a button that is held and moved by a user, and outputs information indicating a movement amount of the operation unit and information indicating a result of the operation for the button. The computer 1 can obtain information output by the mouse 3a through the device interface 30, and can receive the operation of the user based on the information. The keyboard 3b includes a plurality of keys, and outputs information indicating an operation for the key. The computer 1 can obtain the information output by the keyboard 3b through the device interface 30, and can receive the operation of the user based on the information.

The display interface 40 is an interface to which a display 4 is connected. The computer 1 is configured to display various images on the display 4 by outputting a control signal to the display 4 through the display interface 40.

The processor 10 includes a CPU, a RAM, and the like, and can execute various programs stored in the HDD 20. In the present embodiment, a machine learning program 11 and an image processing program 12 are included in these programs. The machine learning program 11 is a program causing the processor 10 to perform a function of learning an imaging time of a photograph in which an imaging date is not imprinted based on the photographic data items of the scanned photographs. When the machine learning program 11 is executed, the processor 10 functions as a learning target obtaining unit 11a and a learning unit 11b.

The image processing program 12 is a program causing the processor 10 to perform a function of calculating degrees of fading of the photographs based on the photographic data items obtained by scanning the photographs, and organizing the photographic data items according to degrees of oldness of the photographs by deeming the photograph of which the degree of fading is larger to be an old photograph. When the image processing program 12 is executed, the processor 10 functions as an obtaining unit 12a, a calculating unit 12b, a reading unit 12c, and an organizing unit 12d.

(2) Machine Learning Processing

Figure 2:
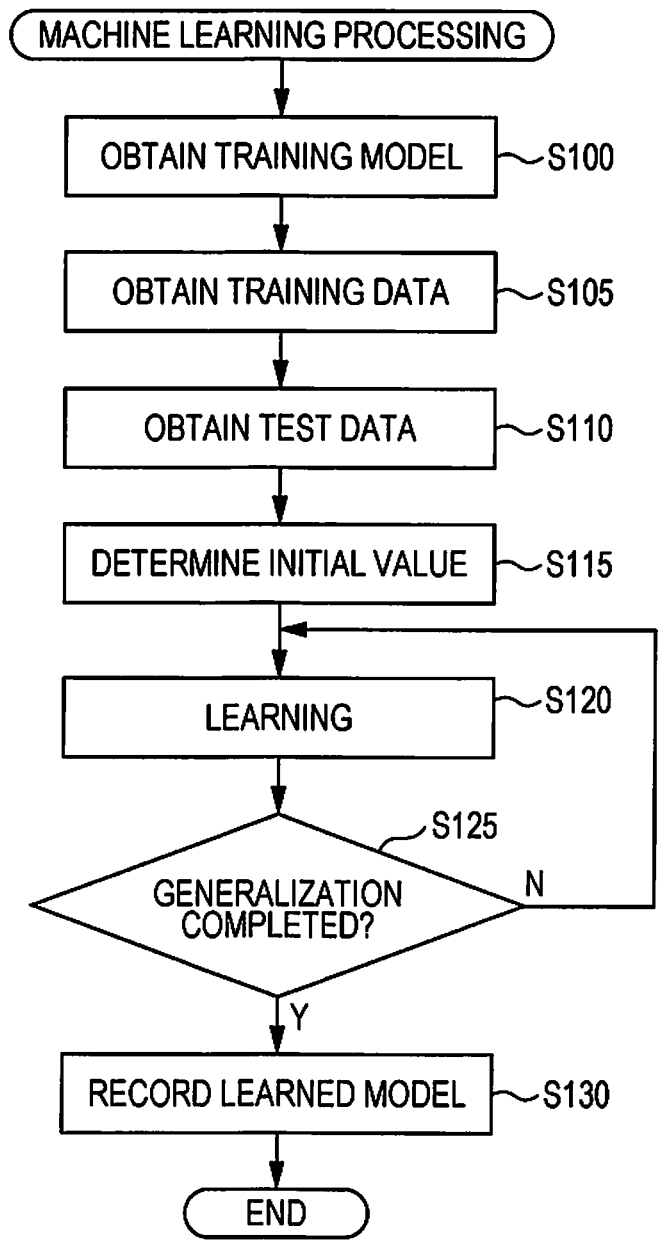
FIG. 2 is a flowchart illustrating machine learning processing.

Next, machine learning processing performed by the processor 10 will be described. FIG. 2 is a flowchart illustrating the machine learning processing. The machine learning processing is performed in advance before the imaging time of the photograph is estimated. When the machine learning processing is started, the processor 10 obtains a training model by the function of the learning unit 11b (step S100). In this example, the model is information indicating an expression for deriving a correspondence between data of an estimation target and data of an estimation result. In the present embodiment, a model in which the photographic data items or the data items (the degrees of fading) derived from the photographic data items are associated with imaging time will be described as an example.

Figure 3:
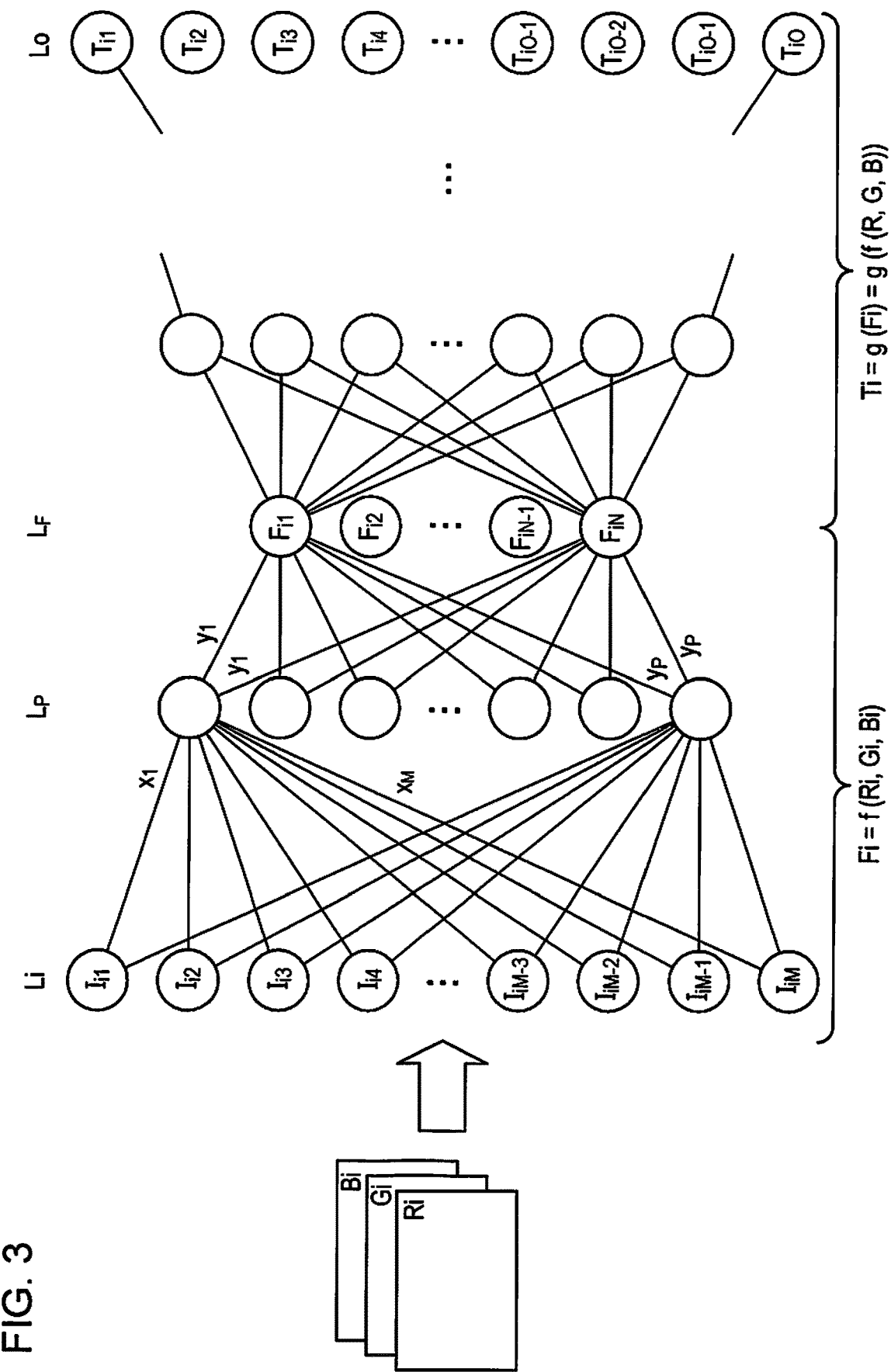
FIG. 3 is a diagram illustrating a structure of a neural network.

The model can be defined in various manners as long as input data items are converted into output data items. In the present embodiment, a neural network is included in at least a part of the model. FIG. 3 is a schematic diagram illustrating a structure of a neural network that may include the model used in the present embodiment. In FIG. 3, nodes modeling neurons are represented by circles, and connections between the nodes are represented by straight lines as solid lines (in this regard, a part of the nodes and the connections are represented for the sake of simplicity of illustration). In FIG. 3, the nodes belonging to the same layer are represented so as to be vertically lined up, a layer at a left end is an input layer Li, and a layer at a right end is an output layer Lo.

In this example, in the relationship between two layers, a layer closer to the input layer Li is referred to as a higher layer, and a layer closer to the output layer Lo is referred to as a lower layer. That is, a structure in which outputs of a layer which is higher than a certain layer by one layer are inputs for the certain layer and values obtained by respectively multiplying the inputs by weights and respectively adding biases to the multiplied resultant values are output through an activation function is illustrated. For example, when the number of nodes of a layer $L_P$ illustrated in FIG. 3 is P, input data items for each node of the layer $L_P$ are $x_1, \ldots, x_M$, biases are $b_1, \ldots, b_P$, weights for a k-th node of the layer $L_P$ are $w_{k1}, \ldots, w_{kM}$, and the activation function is h(u), intermediate outputs $u_1, \ldots, u_P$ of each node of the layer $L_P$ are expressed by the following Expression 1.

$$(u_1 \ldots u_k \ldots u_P) = (x_1 \ldots x_k \ldots x_M) \begin{pmatrix} w_{11} & \ldots & w_{k1} & \ldots & w_{P1} \\ & & \vdots & & \\ w_{1k} & \ldots & w_{kk} & \ldots & w_{Pk} \\ & & \vdots & & \\ w_{1M} & \ldots & w_{kM} & \ldots & w_{PM} \end{pmatrix} + (b_1 \ldots b_k \ldots b_P) \quad (1)$$

Accordingly, when Expression 1 is substituted into the activation function h(uk), outputs $y_1, \ldots, y_P$ of the nodes of the layer $L_P$ are obtained.

The model is constructed by providing a plurality of nodes generalized in this manner. Accordingly, in the present embodiment, the model is constituted by at least data items indicating the weights, the biases, and the activation functions in each layer. Various functions, for example, a sigmoid function, hyperbolic function (tan h), rectified linear unit (ReLU), and other functions can be used as the activation function. A nonlinear function may be used. Of course, other conditions necessary for machine learning, for example, parameters such as kinds or learning rates of optimization algorithms may be included. There may be various aspects as the connection relationship of the number of layers or the number of nodes, and the correlation.

In the present embodiment, a model in which the output data items indicating the imaging times of the photographs are output from the output layer Lo by using the photographic data items or the data items derived from the photographic data items as input data items for the input layer Li is constructed. For example, in the example illustrated in FIG. 3, an example in which the input data items of each node of the input layer Li are gradation values of each pixel of the photographic data items (values by standardizing the gradation values thereof) and the output data items from the output layer Lo correspond to the ranges of the imaging time can be assumed. An example of the configuration in which the imaging time is output is a configuration in which the time ranges such as 1900s, 1910s, and 1920s are assigned to the nodes and the range assigned to the node that outputs the maximum value is deemed to be the imaging time of the input photograph.

Of course, a part of the model illustrated in FIG. 3 may be expressed by a known function, the remaining part thereof may be expressed by an unknown function, and the unknown function may be a learning target. In any case, when the model in which the photographic data items are input and the imaging time is ultimately output is constructed, the model for estimating the imaging times from the photographic data items can be learned. Although it has been described in the present embodiment that the model is constructed based on such an idea, this idea is based on the fact that the color of the photographic print fades over time.

That is, in the present embodiment, the degree of oldness of the photograph is deemed to correspond to a time interval between the printed date and the current date. In the present embodiment, as the time interval between the printed date and the current date is longer, the degree of fading is deemed to be large.

In the present embodiment, the printed date and the imaging date are rarely deemed to be greatly different (for example, for every several years). By deeming in this manner, the degree of fading of the photograph and the degree of oldness of the imaging time can be deemed to correspond to each other. When the photographic data is input and the degree of fading is calculated, the degree of oldness of the photograph, that is, the imaging time can be estimated through this calculation.

According to such an idea, when the neural network illustrated in FIG. 3 is learned such that the photographic data items are input to the input layer Li and the imaging times is output from the output layer Lo, it is considered that the values indicating the degrees of fading are output from a layer which is higher than the output layer by one or more layers. In order to enable the estimation of the imaging times through the degrees of fading, the layer that outputs the degrees of fading may be automatically learned as a hidden layer in the machine learning, or the degrees of fading may be more explicitly introduced into the model.

For example, a neural network in which a function that calculates the degrees of fading by inputting the photographic data items is prepared in advance and the degrees of fading are output may be constructed. For example, such a model can be constructed by expressing layers between the input layer Li of the model illustrated in FIG. 3 and a layer $L_F$ that outputs the degrees of fading by a known function f. That is, a model in which the function f that calculates the degrees of fading is defined from the gradation values (Ri, Gi, Bi) of the photographic data items in advance and outputs Fi of the function are used as outputs for the layer $L_F$ may be constructed.

Figure 4:
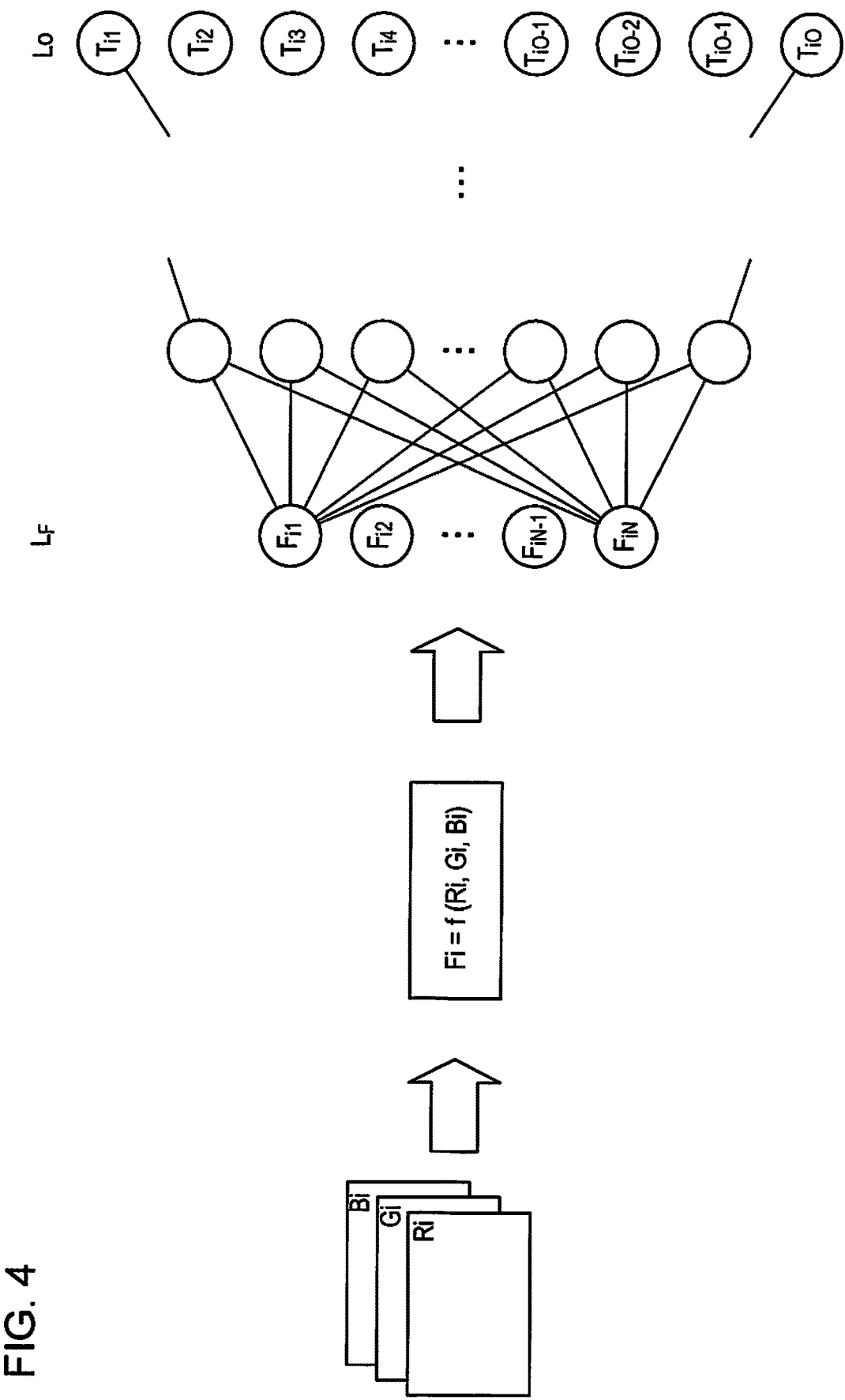
FIG. 4 is a diagram illustrating an example of a model.

FIG. 4 is a schematic diagram illustrating a model in which the values Fi indicating the degrees of fading are calculated by using the function f. That is, when gradation values of color channels of each pixel of certain photographic data i are (Ri, Gi, Bi) and these gradation values are input to the function f, output values $F_{i1}$ to $F_{iN}$ indicating degrees of fading are obtained. When the output values $F_{i1}$ to $F_{iN}$ indicating the degrees of fading are input to the layer $L_F$ and a model between the Layer $L_F$ and the output layer Lo is optimized by the machine learning, a model in which information items ($T_{i1}$ to $T_{iO}$) indicating the imaging times of the photographs are output from the degrees of fading of the photograph can be learned.

The function f that calculates the degree of fading may be defined by various methods. The degree of fading may be evaluated by various method. For example, when a contrast width of a color (yellow or the like) which tends to deteriorate on the printed photograph is analyzed, it is possible to determine that as the contrast of this color is lower, the degrees of fading are large. The color of interest may be at least one of color components of the photographic data items, or may be a color (yellow or the like) calculated from two or more color components. Of course, a target of interest may be a target other than hue, and the degrees of fading may be determined based on contrast of brightness or saturation. Of course, various known processing may be adopted in addition to these processing.

In any case, the function f for calculating the value indicating the degree of fading is defined in advance, and the outputs $F_{i1}$ to $F_{iN}$ thereof are the input values for the layer $L_F$. The number of values (the number of functions f) indicating the degrees of fading may be one or more, and the number of nodes of the layer $L_F$ is 1 when the degree of fading is expressed by one kind of value for one photograph. In any case of FIGS. 3 and 4, the range of input data may not be the entire range of the photograph, and may be a specific color channel. A weight may be provided for the specific color channel.

In the present specification, hereinafter, an embodiment will be described by using the model in which the degree of fading is calculated by the function f based on the photographic data and the value indicating the degree of fading is input to the node of the neural network as an example illustrated in FIG. 4. It will be assumed in this example that the model in which the imaging time of the photograph is expressed by a predetermined period of time (1900s or the like). Of course, the imaging time of the photograph may be expressed in various formats. In the example illustrated in FIG. 4, when information indicating the imaging time is a period of time of a predetermined range and when the output values ($T_{i1}$ to $T_{iO}$) of the output layer Lo is closest to 1, it is estimated that the period of time associated with this node is the imaging time. For example, when 1900s is associated with the node that outputs the output value $T_{i1}$ and a period of time indicated by each node is expressed every 10 years, an output value of the node associated with 1900s is 0.95, and the imaging time is estimated as 1900s when an output value of another node is a value smaller than 0.95 (the sum of the outputs of all the nodes is 1).

In step S100 in the flowchart illustrated in FIG. 2, the training model is obtained. In this example, the training refers to a learning target. That is, the degree of fading is calculated from the photographic data and the imaging time of the photograph is output based on the degree of fading in the training model. However, a correspondence between the photographic data and the imaging time of the photograph is not accurate at the beginning. That is, the number of layers constituted by the nodes or the number of nodes is determined in the training model, but the parameters (the weights, the biases, or the like) for defining the relationship between the inputs and the outputs are not optimized. These parameters are optimized (that is, trained) during the machine learning.

The training model may be determined in advance or may be obtained by being input by the user who operates the mouse 3a or the keyboard 3b. In any case, the processor 10 obtains the function for calculating the degree of fading from the photographic data in the example illustrated in FIG. 4 and the parameters of the neural network that outputs the imaging time of the photograph by inputting the degree of fading as the training model. The training model is stored as a training model 20e in the HDD 20.

Subsequently, the processor 10 obtains training data items by the function of the learning target obtaining unit 11a (step S105). In the present embodiment, training data items 20c are training data items obtained by associating the photographic data items of the scanned photographs with the imaging times of the photographs. In the present embodiment, a plurality of photographs is scanned by the scanner 2 in advance, and is stored in the HDD 20. The processor 10 can perform a function of reading the imaging dates imprinted on the photographs (a reading unit 12c to be described below).

In this example, the processor 10 detects a portion having a shape feature of numerical values based on the photographic data, and specifies the arrangement of numerical values or based on the shape feature of the detected portion. The arrangement of the numerical values is deemed to be the imaging date, and the imaging time is obtained. When the imaging time is obtained, the processor 10 associates the imaging time with the photographic data of the photograph. When the user remembers the imaging time of the photograph, the user specifies the imaging time of the scanned photograph based on their remembrance, and inputs the imaging time by operating the mouse 3a or the keyboard 3b. The processor 10 associates the photographic data with the imaging time based on the input result.

As a result, the photographic data items of the plurality of photographs associated with the imaging times are stored in the HDD 20. The information indicating the imaging time may be a time including the imaging date of the photograph, may be defined in various formats, and may match with at least the format of the imaging time expressed by the output of the training model. In the example illustrated in FIG. 4, the imaging time expressed by a predetermined period of time such as 1900s or the like is associated with the photographic data. In the present embodiment, some of the photographic data items associated with the imaging times in this manner become the training data items. Thus, the processor 10 randomly extracts the photographic data items associated with the imaging times while referring to the HDD 20, deems the extracted photographic data items to be the training data items, and stores the extracted photographic data items in the HDD 20 (training data items 20c).

Subsequently, the processor 10 obtains test data by the function of the learning target obtaining unit 11a (step S110). In the present embodiment, some or all of the data items which are not deemed to be the training data items, among the photographic data items associated with the imaging times, become the test data items. Thus, the processor 10 obtains the test data items from the data items which are not deemed to be the training data items, among the photographic data items associated with the imaging times, while referring to the HDD 20, and stores the obtained test data items in the HDD 20 (test data items 20d). The amount of information (the number of photographs) of the test data items 20d and the amount of information (the number of photographs) of the training data items 20c may be various amounts. In the present embodiment, the amount of information of the training data items 20c is set to be larger than the amount of information of the test data items 20d.

Subsequently, the processor 10 determines an initial value by the function of the learning unit 11b (step S115). That is, the processor 10 gives the initial value to a variable parameter among the training model obtained in step S100. The initial value may be determined by various methods. For example, a random value or zero can be used as the initial value, and the initial value may be determined based on an idea that the initial value is different for the weight and the bias. Of course, the initial value may be adjusted such that the parameter is optimized during learning.

Subsequently, the processor 10 performs the learning by the function of the learning unit 11b (step S120). That is, the processor 10 inputs the training data items 20c obtained in step S105 to the training model obtained in step S100, and calculates the outputs indicating the imaging times. An error is specified by a loss function indicating errors between the output imaging times and the imaging times indicated by the training data items 20c. The processor 10 repeats processing for updating the parameter based on differential using a parameter of the loss function by a predetermined number of times.

For example, in the model illustrated in FIG. 4, the processor 10 obtains the degrees of fading ($F_{i1}$ to $F_{iN}$) of an i-th photograph by inputting the photographic data of the i-th photograph indicated by the training data items 20c obtained in step S105 to the function f. The processor 10 inputs the degrees of fading ($F_{i1}$ to $F_{iN}$) of the i-th photograph to the neural network of the layer $L_F$, and obtains output values ($T_{i1}$ to $T_{iO}$) indicating the imaging times of the i-th photograph. The information items indicating the imaging times associated with the training data items 20c are information items indicating that any of the output values of each node is 1. When these information items are expressed as ($t_{i1}$ to $t_{iO}$), a value of any of the $t_{si}$ to do is 1, and other values thereof are zero.

Thus, when the output values of the training model are expressed by $T_i$ and the imaging times indicated by the training data items 20c are expressed by $t_i$, the loss function for the i-th photograph can be expressed by $L(T_i, t_i)$. Of course, various functions can be adopted as the loss function. For example, a cross entropy error or the like can be adopted. Processing for calculating the loss function described above is performed for all the photographs indicated by the training data items 20c, and the loss function in one learning is expressed by the average or sum thereof. For example, when the loss function is expressed by the sum, the total loss function E is expressed by the following Expression 2.

$$E = \sum_i L_i(T_i, t_i) \qquad (2)$$

When the loss function E is obtained, the processor 10 updates the parameter by a predetermined optimization algorithm, for example, a stochastic gradient descent method.

When the updating of the parameter is performed by a predetermined number of times, the processor 10 determines whether or not the generalization of the training model is completed (step S125). That is, the processor 10 inputs the test data items 20d obtained in step S110 to the training model, and obtains the outputs indicating the imaging times. The processor 10 obtains the number of photographs for which the output imaging times and the imaging times associated with the test data items match, and obtains estimation accuracy by dividing the number of photographs by the number of photographs indicated by the test data items 20d. In the present embodiment, the processor 10 determines whether or not the generalization thereof is completed when the estimation accuracy is equal to or greater than a threshold value.

The validity of a hyperparameter may be verified in addition to the evaluation of generalization performance. That is, a hyperparameter which is a variable amount other than the weight and the bias. For example, in a configuration in which the number of nodes or the like is tuned, the processor 10 may verify the validity of the hyperparameter based on verification data. Through the same processing as step S110, the verification data may be obtained by extracting the verification data in advance from the photographic data items of the plurality of photographs associated with the imaging times and securing the extracted verification data items as data items which are not used in the training.

When it is not determined that the generalization of the training model is completed in step S125, the processor 10 repeats step S120. That is, the process further updates the weight and the bias. Meanwhile, when it is determined that the generalization of the training model is completed in step S125, the processor 10 stores a learned model (step S130). That is, the processor 10 stores the training model as a learned model 20b in the HDD 20.

According to the aforementioned configuration, it is possible to estimate the imaging time of any photograph by inputting any photographic data to the learned model 20b and outputting information indicating the imaging time. Accordingly, even though the imaging date is not imprinted in the photograph, it is possible to estimate the imaging time when the photograph is captured. In the present embodiment, since the learning is performed based on the training data items obtained by associating the photographic data items with the imaging times of the photographs, it is possible to estimate the imaging time of the photograph even though the relationship between the feature of the photograph and the imaging time is not clearly defined by human judgment. The function f for calculating the degree of fading of the photographic data is included in the model illustrated in FIG. 4. However, it is possible to estimate the imaging time of the photograph even though at least the relationship between the degree of fading and the imaging time is not explicitly defined. Particularly, since the degree of fading of the photograph is greatly influenced by the storage environment of the photograph, it is possible to more accurately estimate the imaging time in a case in which the relationship between the feature of the photograph and the imaging time is learned and defined based on the photograph stored by the user as compared to a case in which a manufacturer defines the relationship between the feature of the photograph and the imaging time.

The data items obtained by associating the photographic data items with the imaging times are included in the training data items in the present embodiment by reading the imaging date imprinted in the photograph and checking the imaging time. Accordingly, the data items obtained by associating the photographic data items with the imaging times accurately indicating the imaging dates of the photographs are included in the training data items. Thus, according to the training data items, it is possible to increase a possibility that the learned model $20b$ is to accurately output the imaging times.

(3) Image Processing

Figure 5:
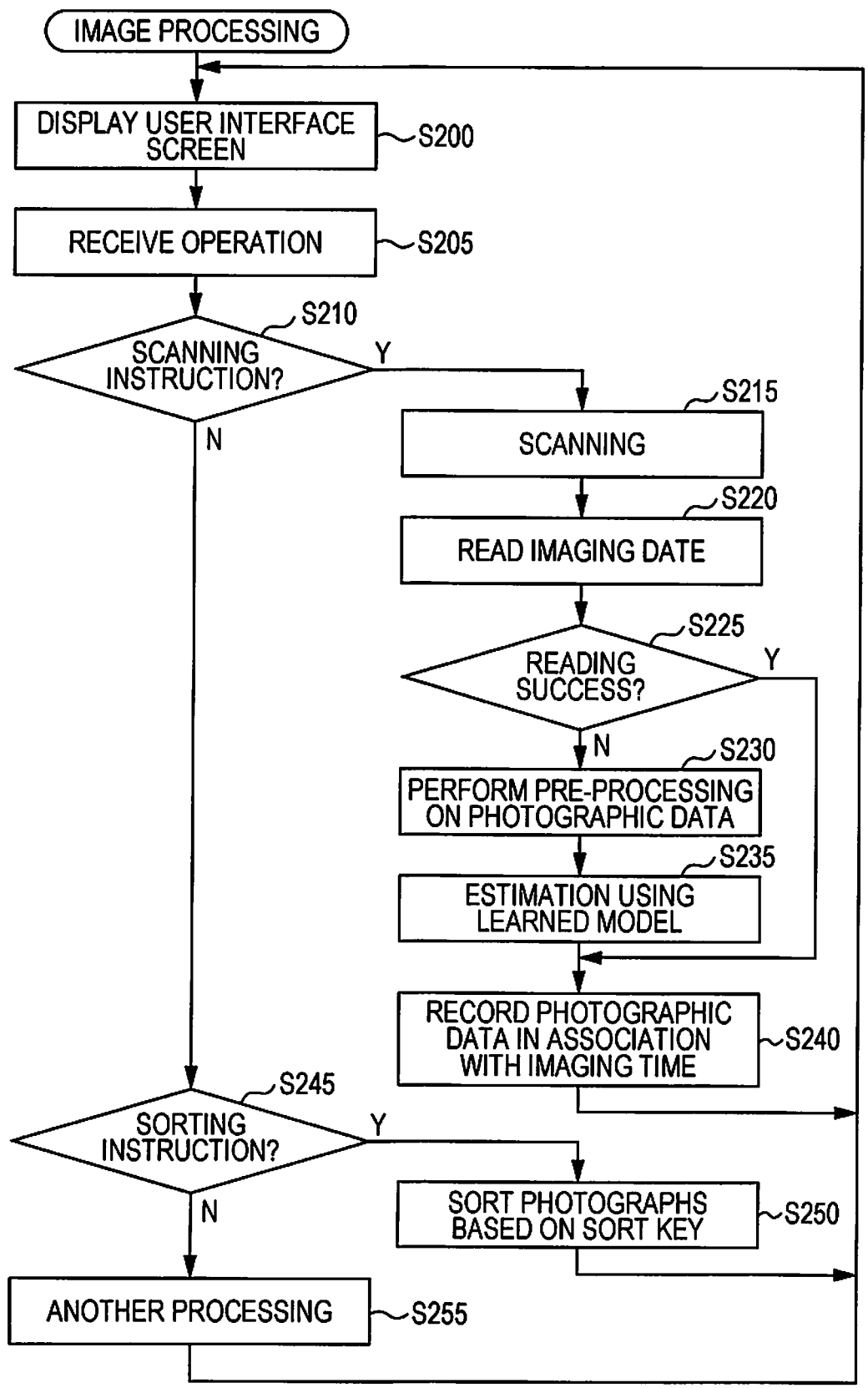
FIG. 5 is a flowchart illustrating image processing.

Next, image processing performed by the processor 10 will be described. FIG. 5 is a flowchart illustrating the image processing. The image processing is performed by the user when the user wants to perform processing (organizing, editing, or the like) related to the photographic data items. That is, the user issues an instruction to perform the image processing by operating the mouse $3a$ or the keyboard $3b$ while viewing the display 4. The instruction may be issued by various methods, and corresponds to an activation instruction of an application program for scanning an image in the present embodiment.

When the image processing is started, the processor 10 displays a user interface screen by the function of the obtaining unit $12a$ (step S200). That is, the processor 10 draws the user interface screen including predetermined display items while referring to data items of icons or the like (not shown) stored in the HDD 20 by the function of the obtaining unit $12a$ (stores image data or the like in a RAM). The processor 10 displays the interface screen on the display 4 by outputting the drawing contents to the display 4 through the display interface 40.

Figure 6:
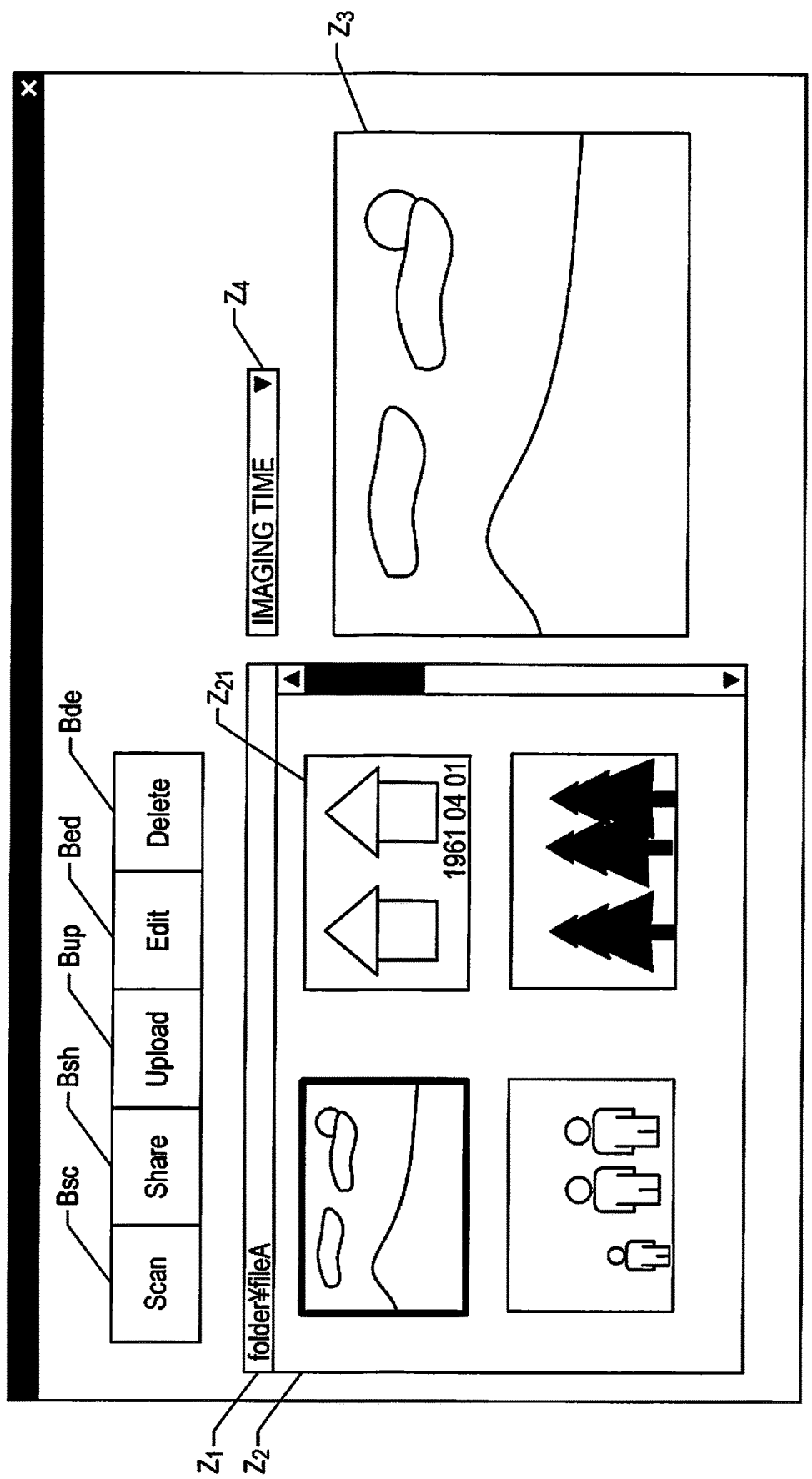
FIG. 6 is a diagram illustrating an example of an interface screen.

FIG. 6 is a diagram illustrating an example of the interface screen. In the example illustrated in FIG. 6, buttons Bsc, Bsh, Bup, Bed, and Bde indicating functions to be performed are displayed on an upper part of the screen. A region $Z_1$ indicating a storage location of the photographic data indicating the photograph and a region $Z_2$ for displaying a minified image of the photographic data stored in the storage location are provided on a left side of the screen. In the region $Z_2$, since a scroll bar is displayed when all the photographs stored in the same storage location cannot be displayed in a list, the user can search for a desired photograph according to an instruction using the scroll bar even though there are a large amount of photographs. A region $Z_3$ for displaying one photograph selected from the photographs displayed in the region $Z_1$ and a region $Z_4$ for instructing a key when the photographs are sorted are provided on a right side of the screen. The sort key may be various keys, and includes the imaging times in the present embodiment. In addition, a file name or another condition may be selected as the sort key.

The button Bsc is a button for issuing an instruction to perform a scanning function, the button Bsh is a button for issuing an instruction to share the photographs (for example, for transmitting the photographs by an e-mail), and the button Bup is a button for issuing an instruction to upload the photographs to a predetermined server. Hardware used for communication is omitted in FIG. 1. The button Bed is a button for issuing an instruction to edit the photographs (for adjusting brightness or the like), and the button Bde is a button for issuing an instruction to delete the photograph. When the instruction other than the scanning function is issued, the user selects the photograph displayed in the region $Z_2$ by the mouse $3a$ or the keyboard $3b$, and instructs the button Bsh or the like to perform the function for the selected photograph. The photograph instructed by the user is displayed in the region $Z_3$ by the processor 10. In the example illustrated in FIG. 6, an outer frame of the photograph selected in the region $Z_2$ is represented by a thick solid line, and the selected photograph is displayed in the region $Z_3$.

When the user instructs the button Bsc by using the mouse $3a$ or the keyboard $3b$, the processor 10 controls the device interface 30 to start the scanning of the photographs using the scanner 2. In the present embodiment, the user can sort the photographs displayed on the interface screen illustrated in FIG. 6, and can display the photographs in the sorted order. In the region $Z_4$, a sort key can be displayed in a pulldown format. When the user selects the sort key, the processor 10 sorts the photographs by the selected sort key, and redisplays the photographs in the region Z2 in the sorted order. Although it has been described in the example illustrated in FIG. 6 that four photographs are displayed in the region $Z_2$, the number of photographs to be displayed may be any number.

The processor 10 performs the processing corresponding to the operation of the user on the user interface screen in the order illustrated in FIG. 5. Thus, the processor 10 receives the operation of the user (step S205). That is, the processor 10 receives output information of the mouse $3a$ or the keyboard $3b$ through the device interface 30, and determines whether the operation performed by the user is the instruction for any of the buttons Bsc, Bsh, Bup, Bed, and Bde or the selection of the sort key in the region $Z_4$.

When the operation performed by the user is the instruction for the button Bsc, the processor 10 determines that the scanning instruction is performed in step S210. When it is determined that the scanning instruction is performed in step S210, the processor 10 scans the photograph and obtains the photographic data by the function of the obtaining unit $12a$ (step S215). That is, the processor 10 outputs a control signal to the scanner 2 through the device interface 30, and scans the photograph set by the user for the scanner 2. As a result, the scanner 2 outputs the photographic data obtained as the reading result, and the processor 10 obtains the photographic data through the device interface 30. In the present embodiment, the processor 10 stores the scanned photographic data in a default storage location (folder) of the HDD 20, and displays the photograph indicated by the scanned photographic data in the region $Z_2$. When the plurality of photographs is targets to be scanned, the user repeats the set of the photograph for the scanner 2, and the processor 10 scans the plurality of photographs.

Subsequently, the processor 10 reads the imaging date imprinted in the photograph by the function of the reading unit 12c (step S220). That is, the processor 10 detects a portion having the shape feature of the numerical values based on the photographic data of the scanned photograph in step S215, and determines the numerical values based on the shape feature of the detected portion. The arrangement of the numerical values is deemed to be the imaging date, and the imaging time is obtained. For example, when a photograph $Z_{21}$ illustrated in FIG. 6 is used, since the imaging date is Apr. 1, 1961, the processor 10 obtains 1960s as the imaging time. The processor 10 determines whether or not an attempt to read the imaging date succeeds as stated above (step S225), and the processor 10 associates the imaging time (imaging date) with the photographic data of the photograph when the attempt to read the imaging date succeeds (step S240).

Meanwhile, when it is not determined that the attempt to read the imaging date succeeds in step S225, the processor 10 performs pre-processing on the photographic data by the function of the calculating unit 12b (step S230). That is, in the present embodiment, the processor 10 estimates the imaging time of the photograph based on the learned model 20b. The learned model 20b is configured to output the imaging time of the input photographic data according to the predetermined model as stated above. For example, the format for inputting the photographic data needs to have a format capable of being input the aforementioned function f in the example illustrated in FIG. 4. Thus, the processor 10 performs pre-processing (for example, magnifying, minifying, standardizing, or the like) such that the photographic data has the format capable of being input to the learned model 20b.

Subsequently, the processor 10 performs the estimation using the learned model by the functions of the calculating unit 12b and the organizing unit 12d (step S235). That is, the processor 10 obtains the learned model 20b from the HDD 20. The processor 10 uses the photographic data pre-processed in step S230 as the input data for the learned model 20b, and obtains the output result of the learned model 20b as the imaging time. In the example illustrated in FIG. 4, the learned model 20b obtains the degree of fading of the photograph based on the input photographic data, inputs the degree of fading to the neural network, and outputs the imaging time of the photograph. Accordingly, the processor 10 performs the estimation of the degree of fading using the calculating unit 12b and the estimation of the imaging time (the estimation of the degree of oldness) using the organizing unit 12d in step S235.

Subsequently, the processor 10 stores the photographic data in association with the imaging time by the function of the organizing unit 12d (step S240). That is, the processor 10 stores the photographic data in association with the information indicating the imaging time estimated in step S235 in the HDD 20 (photographic data 20a). Through the aforementioned processing, the photographic data 20a obtained by associating the imaging time with the scanned photograph is generated. Through the aforementioned processing, in the present embodiment, it is possible to deem the method of generating the photographic data 20a associated with the imaging time to be performed by the computer 1. The association of the information indicating the imaging time with the photographic data may mean that the imaging time is written an internal region (for example, a header) of a photograph file including the corresponding photographic data or the imaging time is written in an imaging time file different from the photographic data.

Thereafter, the processor 10 draws an image on which the photograph is added in the order corresponding to the sort key selected by the sort key in the region $Z_4$ to be described below by the function of the organizing unit 12d, and displays the drawn image on the display 4.

Meanwhile, when the operation performed by the user is the selection of the sort key in the region $Z_4$, the processor 10 determines that the sorting instruction is performed in step S245. When it is determined that the sorting instruction is performed in step S245, the processor 10 sorts the photographs based on the sort key by the function of the organizing unit 12d (step S250). That is, the user selects the sort key in the region Z4, and sorts the photographs based on the selected sort key while referring to the information associated with the photographic data 20a. When the sorting is performed, the processor 10 draws the image on which the photographs are lined up in the sorted order, and displays the drawn image on the display 4.

In the present embodiment, the user can select the imaging time as the sort key. When the imaging time is selected, the processor 10 selects the imaging time as the sort key, and sorts the photographs. That is, in the present embodiment, the imaging time is associated with the photographic data 20a indicated by the scanned photograph by the processing in step S240. Thus, the processor 10 sorts the photographs in descending order or in ascending order (the descending order or the ascending order may be selected by the user or may be determined in advance) while referring the imaging times associated with the photographic data items 20a.

In the present embodiment, the imaging date is read in step S220, and the read imaging time is associated with the read photographic data 20a in step S240. Accordingly, not the imaging time estimated by the learned model but the read imaging time is associated with the photograph. Thus, for the photograph of which the imaging date is read, the read imaging date is selected as the sort key, and the imaging time (the imaging time estimated based on the degree of fading) output by the learned model 20b is not selected as the sort key. Accordingly, when the sorting is performed in the present embodiment, the read imaging date (the read imaging time) or the imaging date (the imaging time) input by the user is used in preference to the imaging time output by the learned model 20b.

When the imaging time is selected as the sort key in step S250 and there is photographic data 20a which is not associated with the imaging time, the processor attempts to estimate the imaging time. When the attempt to estimate the imaging time succeeds, the processor sorts the photographs in the estimated imaging time, and skips the sorting of the photographs using the corresponding photographic data 20a.

Meanwhile, when the operation performed by the user is another instruction other than the sorting instruction (when the operation performed by the user is any of the buttons Bsh, Bup, Bed, and Bde), the processor 10 performs another processing corresponding to the instruction button (step S255). That is, the processor 10 performs the processing corresponding to the instruction according to the instruction of the user. For example, when the instruction using the button Bsh is performed, the processor 10 displays an input screen of information required for sharing the selected photograph on the display 4. When the user issues an instruction to share the photograph after the information is input, the photograph is shared with a person designated as a sharing target.

When the instruction using the button Bup is performed, the processor 10 transmits the photographic data 20a of the selected photograph to a predetermined server (not shown) through a communication unit (not shown). When the instruction using the button Bed is performed, the processor 10 displays an input screen of information required for editing the selected photograph on the display 4. When the user issues an instruction to edit the photograph after the information is input, the photographic data 20a is updated in a state in which the edited content is reflected. This editing includes editing such as trimming for the image or editing of the information associated with the image. When the user remembers the imaging time of the photograph, the user inputs the imaging time through this editing. When the user inputs the imaging time, the learning and the estimation may be reperformed according to the confirmation of the input of the imaging time. When the instruction using the button Bde is performed, the processor 10 deletes the photographic data 20a of the selected photograph from the HDD 20.

According to the present embodiment, it is possible to estimate an imaging time of any photograph based on the learned model 20b. Since the learned model 20b is configured to output the imaging time of the photograph based on the feature (the degree of fading or the like) of the photograph, it is possible to estimate the imaging time of the photograph even though the imaging date is imprinted in the photograph. Accordingly, it is possible to organize the photographs according to the degrees of oldness by organizing (sorting or the like) the photographs based on the output imaging time. In the present embodiment, the imaging time of the photograph is estimated based on the learned model 20b during sorting. Accordingly, the computer 1 functions as an imaging time estimation apparatus that obtains the imaging time of the photograph in which the imaging date is not imprinted from the model on which machine learning is performed based on the training data obtained by associating the photographic data of the scanned photograph and the imaging time of the photograph.

In the present embodiment, when the imaging date imprinted in the photograph can be read, the sorting is performed while referring to the read imaging date (the read imaging time) in preference to the imaging time estimated by the learned model 20b. Accordingly, it is possible to organize the photographs according to the degrees of oldness based on more accurate information which is capable of specifying the imaging dates of the photographs more reliable than the degrees of fading.

(4) Other Embodiments

The aforementioned embodiment is an example for implementing the present disclosure, and other various embodiments can be adopted. For example, the machine learning apparatus and the image processing apparatus according to the embodiment of the present disclosure may be applied to an electronic device used for the purpose of use other than the reading, for example, a multi-function printer. The method of estimating the imaging time of the photograph in which the imaging date is not imprinted or the method of performing the learning for estimation based on the photographic data as in the aforementioned disclosure may be realized as the disclosure related to a program or the disclosure related to a method.

The number of apparatuses constituting the image processing apparatus may be any number. For example, the apparatus constituting the image processing apparatus may be realized by an apparatus in which the computer 1 and the scanner 2 are integrated, or may be integrated with other various devices, for example, the display 4. The scanner 2 may be controlled by a tablet terminal in which the computer 1 and the display 4 are integrated.

A configuration in which the functions of the computer 1 are realized by a plurality of devices may be adopted. For example, a configuration in which a server and a client is connectable to each other, the machine learning program is executed on one of the server and the client, and the image processing program is executed in the other one thereof may be adopted. When the machine learning and the image processing are performed in apparatuses present in separated positions from each other, the learned model may be shared between these apparatuses, or may be present in one apparatus thereof. When the learned model is present in the apparatus that performs the machine learning and is not present in the apparatus that performs the image processing, the apparatus that performs the image processing inquires of the apparatus that performs the machine learning about the imaging time. Of course, a configuration in which the machine learning apparatus is present as a plurality of distributed apparatuses or a configuration in which the image processing apparatus is present as a plurality of distributed apparatuses may be adopted. The aforementioned embodiment is an example, and an embodiment in which a partial configuration is omitted or another configuration is added may be adopted.

The obtaining unit may obtain the plurality of photographic data items acquired by scanning the photographs. That is, the obtaining unit may obtain the photographic data items indicating the plurality of photographs as targets to be organized. Since the photographic data is also a target for which the degree of fading is calculated, the photographic data has a format in which the degree of fading can be calculated. This format may be various formats. For example, an example in which the format is constructed by a plurality of color channels (R: red, G: green, B: blue, or the like) is used. Additional information such as a generation date may be added to the photographic data. Since the photographic data is obtained through the scanning, a date when the photographic data is generated is not limited to the imaging date unlike the photographic data of the captured photograph. Accordingly, unless there are reasons that the imaging date is imprinted in the photograph, the imaging date of the photograph is known (for example, a case in which a note is written on a rear surface of the printed photograph or the like), or the like, the imaging time of the photograph is unknown. The obtaining unit obtains at least one photograph which is not associated with the imaging time.

The calculating unit may calculate the degree of fading of the photograph for the photographic data. The degree of fading may be a change or a deterioration in color of the printed photograph. When the color of the printed photograph changes over time, the photograph fades. The degree of fading may be evaluated by various methods. In the aforementioned embodiment, as in a case in which the model in which the photographic data is input and the imaging time is output is constructed, even though it is unknown whether or not the degree of fading is explicitly calculated, since the degree of fading is associated with the degree of oldness, it is possible to deem the degree of fading to be calculated within the model. That is, it is possible to deem the output including the calculation of the degree of fading to be performed by the learned model.

The organizing unit may organize the photographic data items according to the degrees of oldness by deeming the photograph of which the degree of fading is larger to be the old photograph. That is, in general, the longer the elapsed time after the photograph is printed, the larger the degree of fading. Thus, the organizing unit deems the photograph of which the degree of fading is larger to be the old photograph.

The degree of oldness is the time interval between the date when the photograph is printed and the current date. The longer the time interval between the printed date and the current date, the older the photograph. Since the printed photograph starts to fade after the photograph is printed, when the photograph is printed after a long time elapses from the imaging date, there may be a little relationship between the degree of fading and the degree of oldness of the imaging date. The degree of fading may change depending on a storage condition of the printed photograph. Accordingly, there may be a photograph having a strong relationship and a photograph having a weak relationship between the degree of oldness of the photograph and the degree of oldness of the imaging date. However, in many cases, even though the imaging date and the printed date are close to each other and the degree of oldness evaluated with the degree of fading is the degree of oldness of the imaging date, when the photographs are organized according to the degrees of oldness, an effect capable of sorting the photographs in a sequence of time without spending time and labor inputting the imaging time by the user is acquired.

The organizing in the organizing unit may be processing for giving various orders to the plurality of photographs based on the degrees of oldness. Accordingly, the organizing may correspond to various processing in addition to the sorting as in the aforementioned embodiment. For example, the organizing may be filtering using the degree of oldness, may be adding the additional information to the photographic data (giving the imaging date or the imaging time or the like), and may be giving the file name to the photographic data, classifying the photographic data, storing the photographic data in the folder, moving the photographic data, deleting the photographic data, or processing the photographic data. Various processing is used as the organizing. Of course, the sorting or the filtering is not limited to the displaying of the photographic data. Other processing, for example, adding the additional information or giving the file name may be used.

The reading unit may read the imaging date imprinted in the photograph. Of course, the reading unit may read a part of the imaging date. For example, when it is not possible to read the date of the numerical values indicating the imaging date due to their unclearness and it is possible to read an imaging year and an imaging month, the reading unit may read the imaging year and month. The imaging date may be imprinted in the photograph. That is, the imaging year, month, and date expressed by the numerical values of the color which is hard to be used for the photograph may be printed near the side or corner of the printed photograph.

The reading using the reading unit may be realized by various technologies for recognizing the numerical values. Accordingly, as stated above, a technology for recognizing the imaging date by obtaining the shape feature of the numerical values may be used, or a technology for recognizing the numerical values from the imaging through the machine learning. Various configurations for recognizing the numerical values can be adopted. When the numerical values are recognized, it is preferable that the imaging date is selected based on the position of the numerical values due to the arrangement of the numerical values which may be the date. The arrangement of the numerical values which may be the date is an arrangement such as YYYY/MM/DD, and is not an unlikely date such as the representation of February 35.

When the photographs are organized according to the imaging date in preference to the degree of fading, the read imaging date may be reflected on the organizing in preference to the degree of oldness estimated from the degree of fading. The organizing of the photographs according to the imaging date in preference to the degree of oldness means that the same photograph is organized based on the imaging date when the imaging date and the degree of oldness estimated from the degree of fading are obtained for the same photograph. For example, when the processing as the organizing is the sorting and the imaging date and the degree of oldness estimated from the degree of fading are obtained, the photograph is sorted based on the imaging date.

The imaging time may be the capturing time, may be the imaging date, or may be a longer period of time (for example, an imaging month, an imaging year, or the like). Of course, the imaging time may be a time classified according to another method, for example, a time over a plurality of years such as 1980s or around 1980, a time specified by a range, may be a time interval (40 years ago or the like) from the current date, or the like.

In the aforementioned embodiment, the organizing unit 12*d* obtains the degree of oldness of the photograph, that is, the imaging time of the photograph based on the output of the learned model 20*b*. However, the degree of oldness of the photograph may be determined by another method. For example, a configuration in which the degree of oldness of the photograph is determined based on a predetermined reference may be adopted, or the photograph may be organized by deeming the degree of fading to match the degree of oldness.

Figure 7:
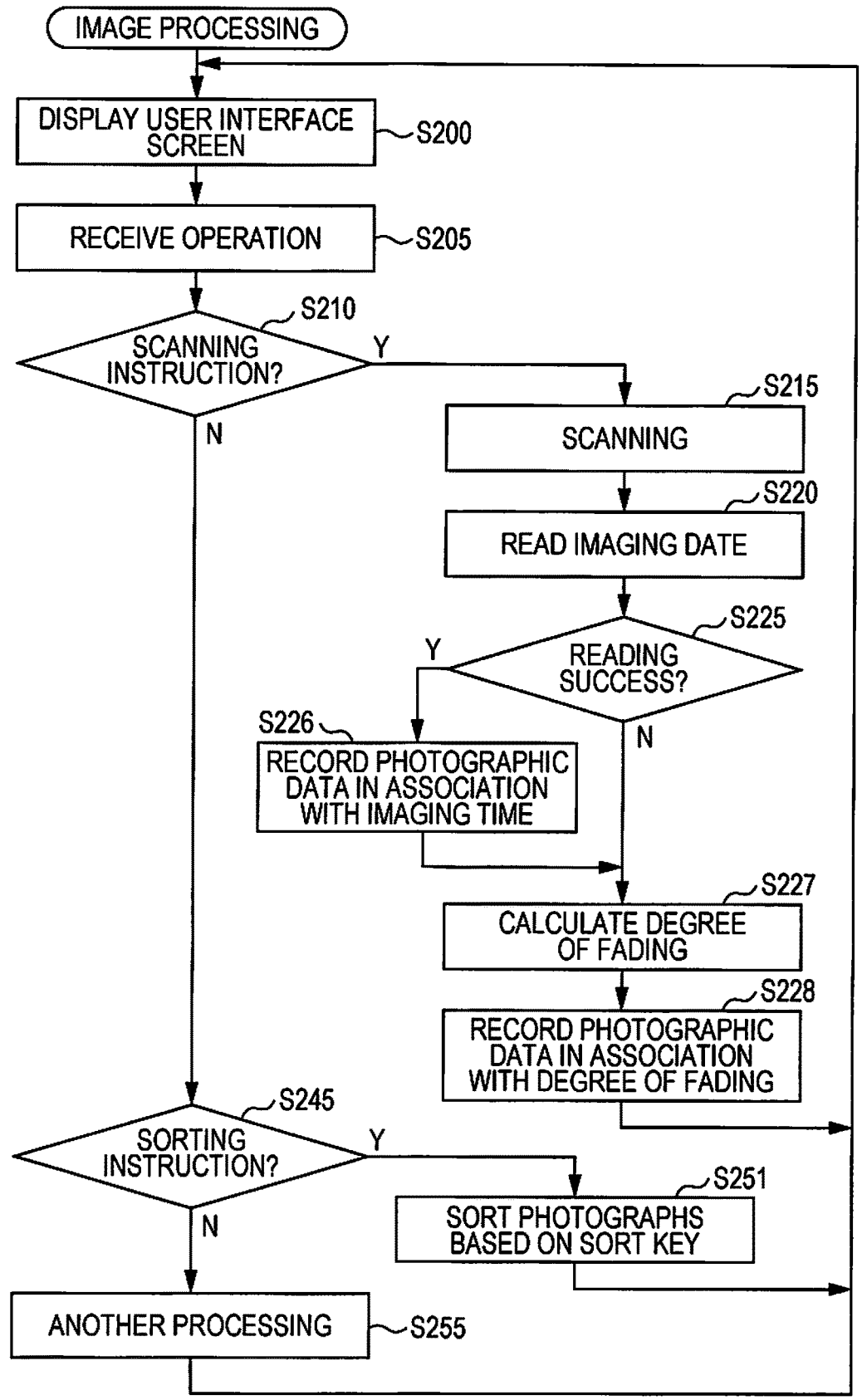
FIG. 7 is a flowchart illustrating image processing.

Specifically, in the embodiment illustrated in FIG. 1, a configuration in which the processor 10 determines the degree of oldness of the photograph by performing the image processing illustrated in FIG. 7 can be adopted. The image processing illustrated in FIG. 7 is processing in which a part of the image processing illustrated in FIG. 5 is changed. The same processing in FIG. 7 as the processing in FIG. 5 will be assigned the same reference numeral. In this example, the description of the same processing as the processing in FIG. 5 will be omitted, and processing different from the processing in FIG. 5 will be mainly described.

In this example, the processor 10 reads the imaging dates from the photographs in which the imaging dates are imprinted by the function of the reading unit 12*c* in step S220 (hereinafter, the photographs in which the imaging dates are imprinted are referred to as first photographs). Subsequently, the processor 10 determines whether or not the attempt to read the imaging date succeeds (step S225). When the attempt to read the imaging date succeeds, the processor 10 stores the photographic data in association with the imaging time by the function of the organizing unit 12*d* (step S226). That is, the processor 10 stores the photographic data in association with the information indicating the imaging time (the imaging date) estimated in step S235 in HDD 20 (photographic data 20*a*).

When it is not determined that the attempt to read the imaging date succeeds in step S225, the processor 10 skips step S226. In this case, the processor 10 deems the imaging dates not to be imprinted in the scanned photographs (hereinafter, the photographs in which the imaging date is not imprinted is referred to as second photographs).

Subsequently, the processor 10 calculates the degree of fading of the photograph by the function of the calculating unit 12b (step S227). Various methods may be adopted as the calculation method of the degree of fading. For example, a configuration in which the degree of fading is calculated by the aforementioned function f, a configuration in which the degree of fading is calculated based on the model obtained by the machine learning based on the photographic data associated with the degree of fading, or the like is used. When the degree of fading is calculated by the function of the calculating unit 12b, the processor 10 stores the photographic data 20a of each photograph in association with the information indicating the degree of fading in the HDD 20 (step S228).

When the processor 10 generates the photographic data 20a as stated above, it is possible to estimate the imaging time of the photograph based on the photographic data 20a. In the present embodiment, the processor 10 estimates the imaging time of the photograph, and sorts the photographs in the order of the estimated imaging times when the photographs are sorted in step S251. That is, in the present embodiment, the processor 10 compares the degrees of fading of the first photographs in which the imaging dates are imprinted with the degrees of fading of the second photographs in which the imaging dates are not imprinted, determines the degrees of oldness of the first photographs and the second photographs, and organizes the photographs.

Specifically, the processor 10 uses all the second photographs as sequential determination targets, and specifies the first photographs as comparison targets for each determination target. The processor 10 compares the degrees of fading of the first photographs as the comparison targets with the degrees of fading of the second photographs as the determination targets. When the degrees of fading of the second photographs are larger than the degrees of fading of the first photographs, the processor 10 determines that the second photographs as the determination targets are older than the first photographs as the comparison targets. When the degrees of fading of the second photographs are smaller than the degrees of fading of the first photographs, the processor 10 determines that the first photographs as the comparison targets are older than the second photographs as the determination targets. According to the aforementioned configuration, it is possible to determine the degree of oldness of the photograph of which the imaging date is unknown by using the photograph of which the imaging date is known as a reference.

The comparison target to be compared with the second photograph may be selected by various methods. For example, the first photograph of which the degree of fading is closest may be the comparison target, the plurality of first photographs of which the degrees of fading are close may be the comparison targets, or a specific first photograph may be the comparison target. Other various methods may be adopted. In the present embodiment, since the imaging times are specified in the first photographs, the processor 10 sorts the first photographs based on the imaging times. The processor 10 sorts the photographs by inserting the second photographs of which the degrees of oldness are specified by using the first photographs as the reference in the order of the photographs in a sequence of time by using the sorted first photographs as the reference.

According to the aforementioned configuration, it is possible to sort the second photographs of which the imaging times are not confirmed through the reading by using the sorted first photographs of which the imaging times are confirmed through the reading as the reference. When the sorting is performed, the processor 10 draws the image on which the photographs are lined up in the sorted order, and displays the drawn image on the display 4. When it is not possible to determine the relationship between the degrees of oldness for all the photographs through the comparison of the first photographs with the second photographs, the relationship between the degrees of oldness may be determined by comparing the degrees of fading of the second photographs.

The imaging time may be estimated in addition to the relationship between the degrees of oldness based on the degrees of fading. This configuration can be realized by a configuration in which the processor 10 estimates the imaging times of the second photographs based on the degrees of fading of the first photographs and the degrees of fading of the second photographs by the function of the organizing unit 12d while referring to the photographic data items 20a. Specifically, a configuration in which the processor 10 associates the imaging times (the imaging dates) of the first photographs with the degrees of fading of the first photographs and deems the second photographs of which the degrees of fading are similar to have same imaging time can be adopted.

When the degrees of fading are different, the processor 10 may deem the imaging times to be different. When there are two or more first photographs, the imaging time corresponding to any degree of fading may be specified based on a difference between the degrees of fading of the first photographs. For example, a configuration in which when a degree of fading of a certain second photograph is between the degrees of fading of two first photographs, the second photograph is deemed to be captured between the imaging times of these first photographs can be adopted. Of course, the imaging times of the second photographs may be estimated from a difference between the imaging times corresponding to a difference between the degree of fading of the first photograph and the degree of fading of the second photograph by deeming the difference between the degrees of fading of two first photographs to correspond to the difference between the imaging times of the first photographs. According to the aforementioned configuration, it is possible to estimate the imaging time of the photograph of which the imaging date is unknown by using the photograph of which the imaging date is known as the reference.

The learning target obtaining unit may obtain the plurality of photographic data items of the scanned photographs. That is, the learning target obtaining unit may obtain the photographic data items of the plurality of photographs as machine learning targets. The photographic data may be the training data to be referred during learning, or the photographic data may be associated with the imaging time in advance. Alternatively, the imaging time may be estimated based on the photograph, and the photographic data may be associated with the estimated imaging time. The latter case may be performed by various methods. For example, a configuration in which the degree of fading of the photograph is specified for each of the photographs of which the imaging times are known and the photographs of which the imaging times are unknown and the imaging times of the photographs of which the imaging times are unknown are estimated based on the degrees of fading can be adopted. Of course, the estimation method of the imaging time may be performed by another method, or the imaging time may be designated by the user based on the note of the rear surface of the photograph or the remembrance of the user.

Since the photographic data is the target for learning the imaging time, the photographic data is data which indirectly includes at least the information indicating the imaging time. For example, since the estimation in which the degree of oldness and the imaging time of the photograph are deemed to substantially match is a reasonable estimation, it is preferable that the degree of oldness of the photograph, for example, the degree of fading is reflected on the photographic data. Thus, the photographic data has a format capable of calculating the degree of fading. This format may be various formats. For example, an example in which the format is constructed by a plurality of color channels (R: red, G: green, B: blue, or the like) is used.

Of course, the pre-processing before the machine learning may be performed on the photographic data. For example, when the size (the number of pixels or the like) of the photographic data to be input during learning is restricted, the size of the photographic data may be adjusted through the magnifying, the minifying, or the like such that various photographic data items have a predetermined size. Normalization for converting a range of gradation values of the photographic data into a predetermined range or the like may be performed, or various image processing such as edge enhancement or gamma conversion may be performed.

The learning unit may learn the imaging times of the photographs in which the imaging dates are not imprinted based on the photographic data. That is, the learning unit may perform the machine learning based on the photographic data and the imaging time of the photograph. The method of the machine learning may be various methods. That is, a model in which the photographic data items and the values (the degrees of fading or the like) derived from the photographic data items are input and the imaging times of the photographs are output may be constructed, and leaning for minimizing a difference between the output from the model and the imaging time of the training data may be performed.

Accordingly, when the machine learning using the neural network is performed, the machine learning may be performed by appropriately selecting various elements such as the number of layers constituting the model, the number of nodes, the kind of the activation function, the kind of the loss function, the kind of the gradient descent method, the kind of the optimization algorithm of the gradient descent method, whether or not to perform mini-batch learning or the number of batches, the learning rate, the initial value, the kind of an over learning suppression method, or whether or not to perform the over learning suppression method, the presence or absence of a convolution layer, the size of a filter in a convolution operation, the kind of the filter, the kind of padding and stride, the kind of a pooling layer, the presence or absence of the pooling layer, the presence or absence of a total binding layer, and the presence or absence of a recursive structure. Of course, another machine learning, for example, learning such as support vector machine, clustering, or reinforcement learning may be performed.

The machine learning in which the structure (for example, the number of layers, the number of nodes for each layer, or the like) of the model is automatically optimized may be performed. The learning may be divided into a plurality of stages and may be performed. For example, a configuration in which the machine learning for learning the degree of fading from the photographic data and the machine learning for learning the imaging time from the degree of fading are performed may be adopted. In a configuration in which the machine learning is performed by the server, the training data items may be collected from a plurality of clients and the machine learning may be performed based on these training data items.

The photograph in which the imaging date is not imprinted may be in a state in which the numerical values deteriorate due to the fading and cannot be read, in addition to a state in which the numerical values indicating the date are not printed near the side or corner of the printed photograph. That is, a state in which the numerical values cannot be read is equivalent to a state in which the imaging date is not imprinted. Since the imaging date of the photograph in which the imaging date is imprinted can be accurately specified by reading the imaging date, it is not necessary to estimate the imaging date of this photograph. However, this photograph may be added to a sample for learning.

The imaging time may be a time estimated as the time when the photograph is captured, may be an imaging date, may be a longer period of time (for example, an imaging month, an imaging year, or the like), may be a time over a plurality of years such as 1980s or around 1980s, may be a time specified by a range, or may be a time interval (40 years ago or the like) from the current date. Of course, the imaging time may be specified by a continuous value (for example, probability, reliability, or the like), or may be specified by a discrete value (for example, a graph indicating any of a plurality of candidates or the like).

When the learning is performed based on the training data obtained by associating the photographic data with the imaging time of the photograph, the photographic data and the imaging time may be the input and the output for the model such as the neural network, or the values (for example, the values indicating the degrees of fading or the like) obtained by processing the inputs may be the input and the output.

The learning or the estimation of the imaging time may be performed based on a clarification instruction from the user. For example, a button of "estimation of imaging time" may be displayed, and the learning and the estimation may be performed by operating this button.

The estimation of the imaging time is not limited to the estimation based on the degree of fading, and may be performed by using another element. For example, the estimation may be performed based on the degree of fading and a degree of deterioration of photograph paper.

The present disclosure is also applicable to a program or a method executed by the computer. The aforementioned program or method may be realized as a single apparatus, or may be realized by using components of a plurality of apparatuses. The aforementioned program or method may include various aspects. The aforementioned program or method may be appropriately changed like a case where a part thereof is software or hardware. The present disclosure is established as a storage medium of a program. Of course, the storage medium of the program may be a magnetic storage medium, or may be a semiconductor memory or the like. Alternatively, any storage medium to be developed in the future can be similarly considered.

What is claimed is:

1. A machine learning apparatus comprising:
a processor that obtains a plurality of photographic data items of photographs, with the photographic data items of the photographs being acquired by scanning the photographs,
the processor training a machine learning model that associates a photographic data item of a photograph or a data item derived from the photographic data item with a shooting time of the photograph based on the photographic data items of the photographs that have been obtained.

2. The machine learning apparatus according to claim 1, wherein
the processor trains the machine leaning model based on training data items that associate the photographic data items of the photographs that have been obtained with shooting times of the photographs.

3. The machine learning apparatus according to claim 2, wherein
the training data items include a training data item that associates a photographic data item acquired by scanning a photograph on which a date stamp is imprinted with a shooting time indicated by the date stamp.

4. An imaging time estimation apparatus comprising:
a processor that obtains a shooting time of a photograph on which a date stamp is not imprinted from a machine leaning model on which machine learning is performed based on training data items that associate photographic data items of photographs with shooting times of the photographs, with the photographic data items of the photographs being acquired by scanning the photographs.

5. A generation method comprising:
obtaining a plurality of photographic data items of photographs, with the photographic data items of the photographs being acquired by scanning the photographs;

generating a machine learning model that associates a photographic data item of a photograph or a data item derived from the photographic data item with a shooting time of the photograph by performing machine learning based on the photographic data items of the photographs that have been obtained; and outputting a shooting time of a photograph on which a date stamp is not imprinted based on the machine learning model.

* * * * *